(12) United States Patent
Hu et al.

(10) Patent No.: US 6,459,506 B1
(45) Date of Patent: Oct. 1, 2002

(54) LIGHTWEIGHT DUAL-MODE MOBILE SCANNER POWERED FROM A UNIVERSAL SERIAL BUS PORT

(75) Inventors: Darwin Hu, San Jose, CA (US); Alpha Hou, San Jose, CA (US)

(73) Assignee: Syscan, Inc., San Jose, CA (US)

( * ) Notice: Subject to any disclaimer, the term of this patent is extended or adjusted under 35 U.S.C. 154(b) by 83 days.

(21) Appl. No.: 09/705,522

(22) Filed: Nov. 2, 2000

Related U.S. Application Data (63) Continuation-in-part of application No. 09/154,395, filed on Sep. 16, 1998.

(51) Int. Cl.$^7$ .............................................. H04N 1/024
(52) U.S. Cl. ...................................... 358/473; 358/475
(58) Field of Search ................................ 358/473, 497, 358/400, 474, 509, 510, 520, 475; 250/234; 382/313

(56) References Cited

U.S. PATENT DOCUMENTS

| | | | | |
|---|---|---|---|---|
| 5,313,642 A | | 5/1994 | Seigel | .......................... 395/75 |
| 5,675,139 A | * | 10/1997 | Fama | .......................... 235/472 |
| 5,729,361 A | | 3/1998 | Suggs et al. | ................. 358/505 |
| 5,956,158 A | | 9/1999 | Pinzarrone | ................... 358/474 |
| 6,060,849 A | | 5/2000 | Tai et al. | ...................... 318/432 |
| 2001/0040987 A1 | * | 11/2001 | Bjorn | .......................... 382/214 |

FOREIGN PATENT DOCUMENTS

| | | |
|---|---|---|
| EP | 0 844 784 A2 | 5/1998 |
| EP | 0 912 040 A2 | 4/1999 |
| JP | 2000-224376 | 8/2000 |

\* cited by examiner

Primary Examiner—Jerome Grant, II
Assistant Examiner—Negussie Worku
(74) Attorney, Agent, or Firm—Joe Zheng (57) ABSTRACT

A portable dual-mode scanner device capable of being powered through a universal serial bus connection where the individual components of the portable scanner are selectively and controllably powered so as to function within the power limitations of the usb port (i.e., 5 Volts, 2.2 watts) without appreciable degradation of a captured image whether that image resides on a transparent media (i.e., a negative) or an opaque media (i.e., paper) is described.

20 Claims, 12 Drawing Sheets

LIGHTWEIGHT DUAL-MODE MOBILE SCANNER POWERED FROM A UNIVERSAL SERIAL BUS PORT

CROSS-REFERENCE TO RELATED APPLICATION

This is a continuation-in-part of co-pending US application Ser. No. 09/154,395, entitled "lightweight mobile scanners", filed Sep. 16, 1998, commonly assigned, by Darwin Hu, et al, two of which are the inventors thereof. This application is also related to U.S. Pat. No. 6,054,707, entitled "Portable scanners capable of scanning both opaque and transparent materials", commonly assigned, by Alpha Hou, one of the co-inventors hereof.

BACKGROUND OF THE INVENTION

1. Field of the Invention

The present invention generally relates to a scanning system and more particularly relates to a mobile scanner capable of scanning both transparent and opaque materials that itself does not have a separate processor and is not energized by a separate power supply, wherein the power required to support the operation of the mobile scanner is derived from a universal serial bus (USB) connection with a computing device.

2. Description of the Related Art

There are many applications that need optical scanners to convert paper-based objects, such as texts and graphics, to an electronic format that can be subsequently analyzed, distributed and archived. One of the most popular optical scanners is flatbed scanners that convert scanning objects, including pictures and papers, to images that can be used, for example, for building World Wide Web pages and optical character recognition. Another popular optical scanner is what is called sheet-fed scanners that are small and unobtrusive enough to sit between a keyboard and a computer monitor or integrated into a keyboard to provide a handy scanning means. Most optical scanners are referred to as image scanners as the output thereof is generally in digital image format.

With the increasing popularity of notebook computers, there is an emerging need for portable scanners suitable for use as notebook computer accessories. Battery powered handheld scanners have been used to fill this role. To be compact and energy efficient, many of these handheld scanners are manually operated, namely a user would have to hold a handheld scanner over a document to be scanned and move it from one end to another end so as to scan in the entire scanning document. However, the quality of images is not always satisfactory, typically suffering from jittered motions of the manual operations.

With the emergence of sheet-fed scanners, such as those Paper Port series from Visioneer Inc., the sheet-fed scanners gradually replace handheld scanners. Because a sheet-fed scanner operates automatically, namely a scanning document is well controlled to pass through an image sensor in the sheet-fed scanner; the resultant images are generally satisfactory.

The current sheet-fed scanners in the market are standalone devices whereas they generally operate with a computer. In addition to an image sensor, an illumination source and a motion mechanism, a typical sheet-fed scanner has a micro-processor, memory, post-processing circuitry and interface circuitry. Further to energize all the parts in the scanner, there is an external power adapter converting a high AC voltage to a low DC voltage. With all the parts together, a sheet-fed scanner is indeed a self-contained system having an interface to a computing system.

Generally there is a micro-processor in the sheet-fed scanners that controls and operates all the parts to work in synchronization. To reduce the cost of a scanner, the microprocessor in use is typically an 8-bit microprocessor, for example, 8088 from Intel, which is considered nowadays a primitive processor in light of available 32-bit or even 64-bit microprocessors. The overall system performance is thus severely limited by the performance of an 8-bit microprocessor.

There exists a need for a scanner that is compact, energy efficient and lightweight enough to be truly compatible with laptop computers. Additionally, there is a need for mobile scanners that are capable of scanning not only regular papers but also transparent materials (i.e., negative or positive films, transparencies for an overhead projectors or X-ray films). The demand for mobile scanners with the dual-scanning capability is ever increasing in both consumer and business markets.

SUMMARY OF THE INVENTION

Accordingly, it is therefore an object of the present invention to provide a portable dual-mode scanner device capable of being powered through a universal serial bus connection where the individual components of the portable scanner are selectively and controllably powered so as to function within the power limitations of a universal serial bus connection port (i.e., 5 Volts, 2.2 watts) without appreciable degradation of a captured image whether that image resides on a transparent media (i.e., a negative) or an opaque media (i.e., paper).

According to one aspect of the present invention, the scanner itself comprises an image sensing module, a motion mechanism and an interface engine. As an important feature in the present invention, the scanner is not powered by an external power adapter rather it is powered through a universal serial connection to a host computer. The image sensing module, including a one-dimensional image sensor, an optical system, a first illumination source (for opaque scanning) and optionally a second illumination source (for transparent scanning), is responsible for imaging content containing media such as a document. The motion mechanism is responsible for moving the document through the image sensing module at a steady speed. Both of the image sensing module and the motion mechanism are coupled to the interface engine that comprises a control circuit. In operation, the circuit receives system control signals from the computing device through the universal serial connection. It then generates logical control signals for the image sensing module and the motion mechanism to operate in synchronization. Further the interface engine draws a power supply from the computing device through a universal serial bus to selectively and controllably energize the image sensing module and the motion mechanism to operate.

According to another aspect of the present invention, the disclosed scanner comprises two demountable cases. The main case houses the image sensing module and the motion mechanism and the base case houses the second illumination source. The first illumination source in the image sensing module provides front illumination to an opaque scanning object while the second illumination source provides back illumination to a transparent scanning object, as such the disclosed scanner is capable of scanning both opaque and transparent materials, a dual scanning feature that has been long sought in the scanning market.

Accordingly, one of the objects in the present invention is to provide a mobile scanner that is of high performance and low cost and so lightweight that it can be used in any conditions.

Other objects, together with the foregoing are attained in the exercise of the invention in the following description and resulting in the embodiment illustrated in the accompanying drawings.

BRIEF DESCRIPTION OF THE DRAWINGS

These and other features, aspects, and advantages of the present invention will become better understood with regard to the following description, appended claims, and accompanying drawings where:

DETAILED DESCRIPTION OF THE INVENTION

Figure 1:
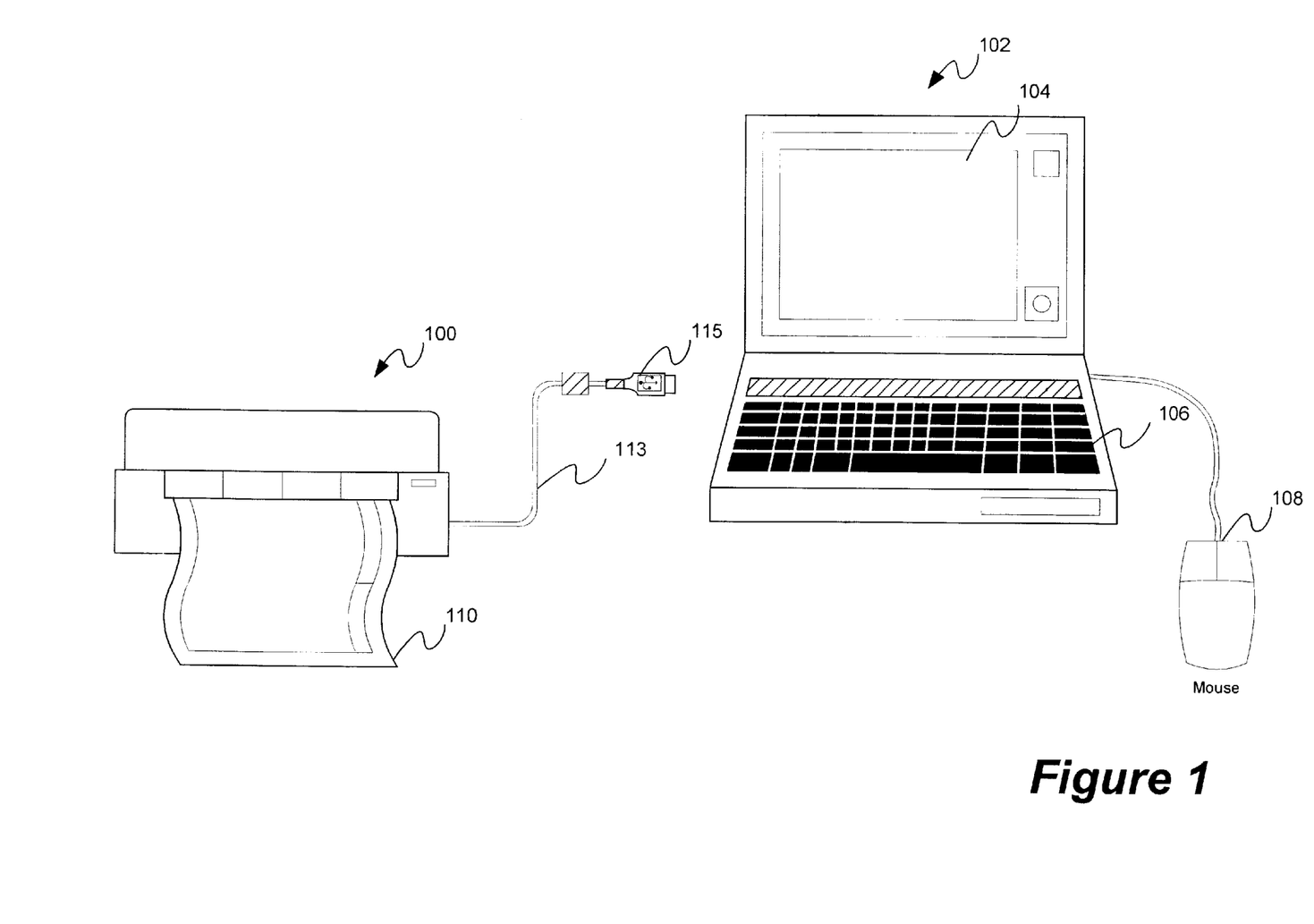
FIG. 1 shows a schematic configuration in which the present invention may be practiced.

Referring now to the drawings, in which like numerals refer to like parts throughout the several views. FIG. 1 shows a schematic configuration in which the present invention may be practiced. Mobile scanner 100 is connected, through a universal serial bus cable 113 to a compatible universal serial bus port (not shown) on a computing device 102. Computing device 102 which may be an IBM PC or PC-compatible notebook computer includes an USB port coupled to the PC bus and controlled by a microprocessor in the computing device. The microprocessor is typically a 32-bit microprocessor such as a Pentium III processor from Intel Corporation.

When the connector 115 on the universal serial bus cable 113 is received at the universal serial bus port (not shown) on computing device 102, not only does an interface engine in scanner 100 receive a power supply from the computing system, typically 5V, but it also becomes integrated into the computing system, receiving system control signals from the microprocessor resident in computing device 102. Through universal serial bus cable 113 and the associated interface engine, mobile scanner 100 can communicate with computing device 102. Further computing device 102 operates an application program under an operating system, for example, Microsoft Windows 98 or Linux. The application program, as will be described in more detail below, is a compiled and linked version of a process that controls the operations of mobile scanner 100 via the universal serial bus connection.

Scanner 100 scans, line by line, a scanning object 110, such as a piece of paper or film with text and/or graphics on it. The scanning result, which is typically a digital representation of scanning object 110, is transferred to computer 102 through universal serial bus cable 113. The digital representation may be converted by the application program to a standard image format such as TIFF (Tag Image File Format) or BMP (Bitmap File Format), that may be manipulated for desired visual effects by another application program, such as PhotoShop 5.0 from Adobe Systems. The digital representation or manipulated digital image can be displayed on display monitor 104.

Computing device 102 is further provided with one or more removable storage devices which may be read or written to, a fixed disk drive (not shown) for storing image files and application program files, a keyboard 106 for permitting input of text data, such as titles and names for scanned image files, and a pointing device 108 such as a mouse or the like which is also provided to permit execution of commands, for example, to display the scanned object and manipulated images thereof on display monitor 104.

Figure 2:
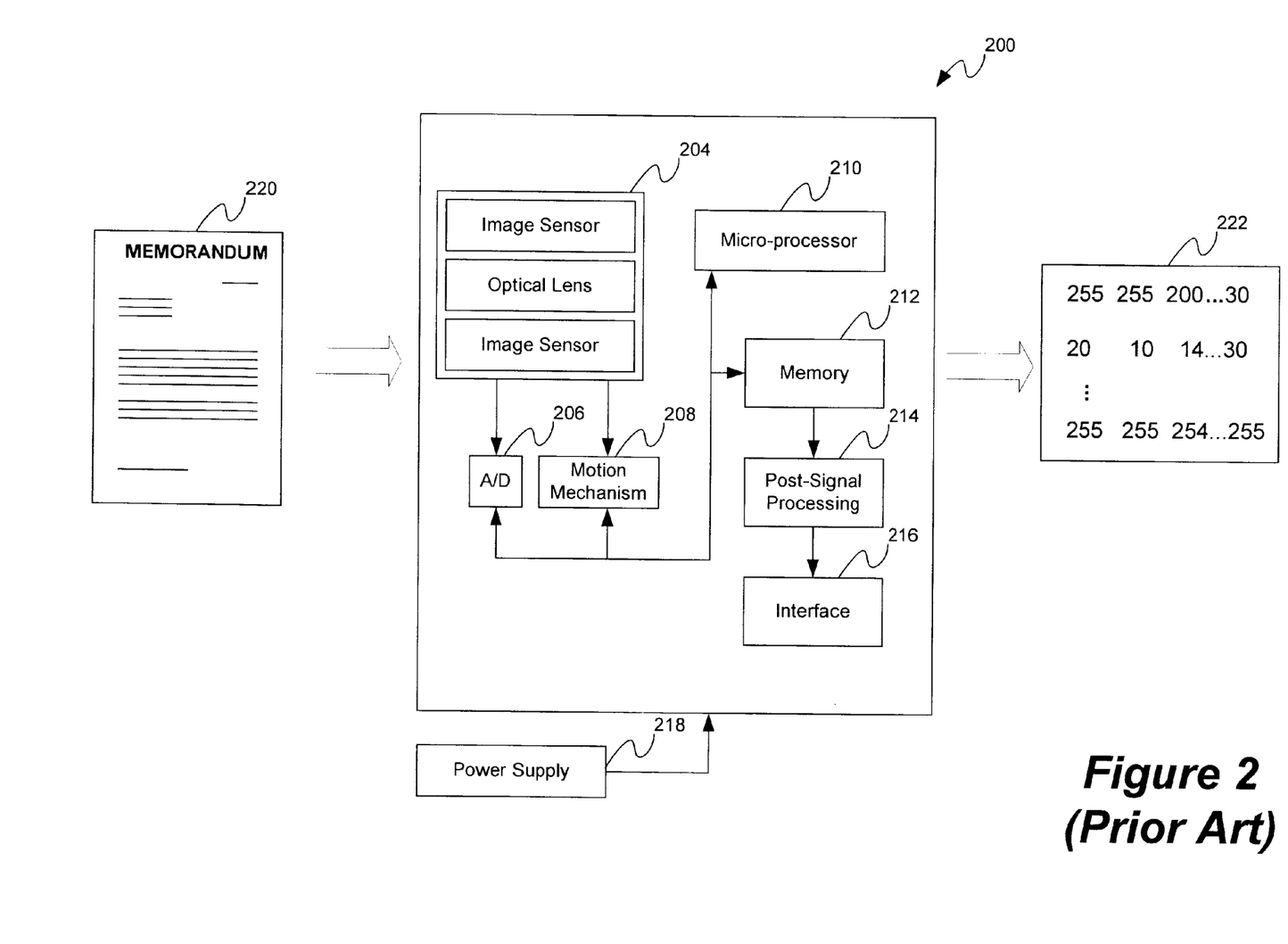
FIG. 2 shows a systemic diagram of a prior art scanner device that converts a paper-based scanning object to a corresponding digital image.

FIG. 2 shows a systemic diagram of a prior art scanner 200 that converts a paper-based scanning object 220 to a corresponding digital image 222. Scanner 200 comprises an image sensing module 204, an analog-to-digital circuitry 206, a motion mechanism 208, a microprocessor 210 and memory 212. Motion mechanism 208 is controlled by microprocessor 210 which works in synchronization with image sensing module 204 such that image sensing module 204 images scanning object 220 while passing through image sensing module 204 at a steady speed.

Image signals from image sensing module 204 are then digitized by analog-to-digital circuitry 206 to produce digital signals (raw data) representing scanning object 220. To have a common interface with most of the computing devices, scanner 200 further comprises a post-signal processing circuitry 214 and an interface 216. Post-signal processing circuitry 214 generally performs digital signals enhancement and often presents the digital signals in a standard image format, such as TIFF or BMP. Interface 216 prepares the images for real-time transmissions through a standard interface, such as IEEE RS-232, via a serial port to a computing device. In addition, power supply 218, typically heavy and bulky, is provided to scanner 200 to energize all the parts in scanner 200 to operate.

Figure 3:
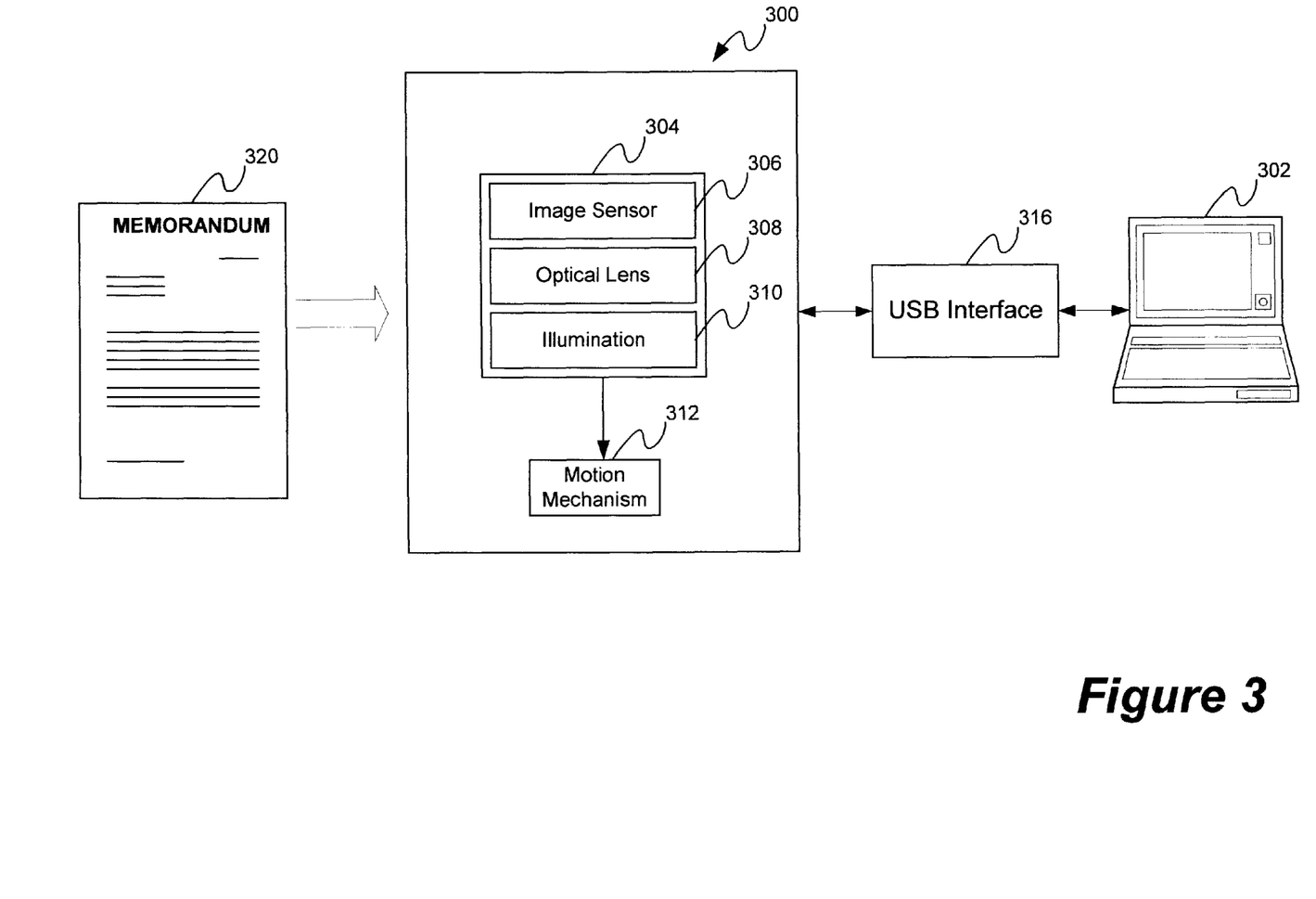
FIG. 3 illustrates a block diagram of a mobile scanner according to one embodiment of the present invention.

Referring now to FIG. 3, there is shown a block diagram of a mobile scanner 300 according to one embodiment of the present invention. Mobile scanner 300 comprises fewer components than found in scanner 200 of FIG. 2. The principle components of scanner 300 are an image sensing module 304 and a motion mechanism 312. It should be noted that there is no separate power supply to energize image sensing module 304 and motion mechanism 312 to work. The elimination of a separate power supply will considerably reduce the overall weight, size and portability of a scanner. As will be further described below, the power for image sensing module 304 and motion mechanism 312 is derived from computing device 302 with which scanner 300 operates.

Image sensing module 304 comprises an image sensor 306, an optical lens 308 and an illumination system 310.

Preferably, image sensor 306 is an array of Complementary Metal-Oxide Semiconductor (CMOS) photodetectors, each producing a charge signal when being exposed to incident light. Generally, the number of photodetectors in the array depends on the maximum size of a scanning document the scanner is designed to accommodate and the resultant image resolution. For example, a regular paper has a size of 8.5×11 inches. For 300 dpi (dot per inch) resolution, the number of photodetectors is 9×300=2,700 wherein 0.5 inch is added to account for a margin of the 8.5-inch width.

Optical lens 308 collects incident light from a scanned object illuminated by illumination source 310 onto image sensor 306, thereby an image of the scanning object is produced. Motion mechanism 312 is responsible for moving the scanning object through image sensor 306 so that the entire scanning object can be scanned. According to one embodiment of the present invention, both image sensing module 302 and motion mechanism 304 are housed in a compact case that can be made of a kind of light but rigid plastic material.

An interface engine such as USB interface 316 houses all the electronic components such as A/D converter, a processor, memory and etc. to control image sensing module 302 and motion mechanism 304 to operate synchronously in addition to support data communication with a host computing device. Depending on an exact implementation, the interface engine may be housed in the same compact case that houses image sensing module 302 and motion mechanism 304. Alternatively, the interface engine may be housed in a separate case, shown in the figure, connected to the serial connection cable. Other possible embodiments include an integration of the interface engine with the serial connection cable.

Figure 4A:
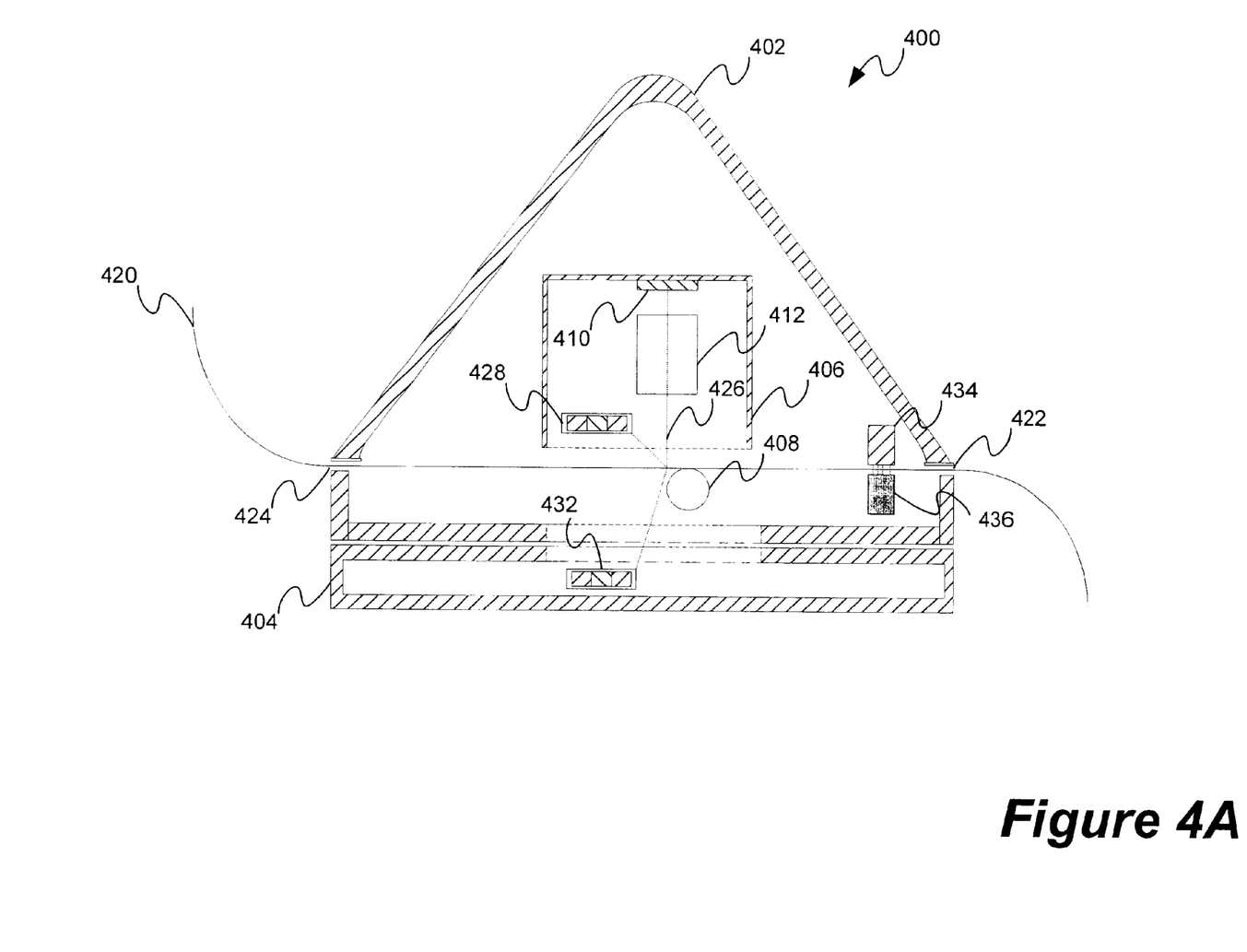
FIG. 4A shows a cross-section view of a mobile scanner that may correspond to the one shown in FIG. 1.

FIG. 4A shows a cross-section view of a mobile scanner 400 according to the present invention and mobile scanner 400 may correspond to mobile scanner 100 of FIG. 1. As shown in the figure, scanner 400, appearing rounded triangle shaped, comprises two demountable portions, a main case 402 and a base case 404, both preferably made of an identical material. Main case 402 houses an image sensing module 406 and motion mechanism of which only a rubber surfaced rod 408 is shown. A scanning object 420 is received from receiving opening 422, then moved by moving rod 408 to pass an optical path 426 and exited from exiting opening 424. When scanning object 420 passes optical path 426, scanning object 420 is illuminated by front illumination source 428, reflected light from scanning object 420 is collected by lens 412 and focused upon image sensor 410. It is noticed that illumination source 428 is referred to as front illumination source because it provides front illumination to a scanning object that is opaque. In other words, when scanning object 420 is transparent, no reflected light can be collected from the scanning object illuminated by illumination source 428.

Base case 404 comprises a second illumination source 432 which provides back illumination and can be removably mounted to main case 402 when there is a need to scan a scanning object that is transparent. The transparent sheet-like scanning object may include negative or positive films, transparencies for an overhead projector or X-ray films.

Figure 4B:
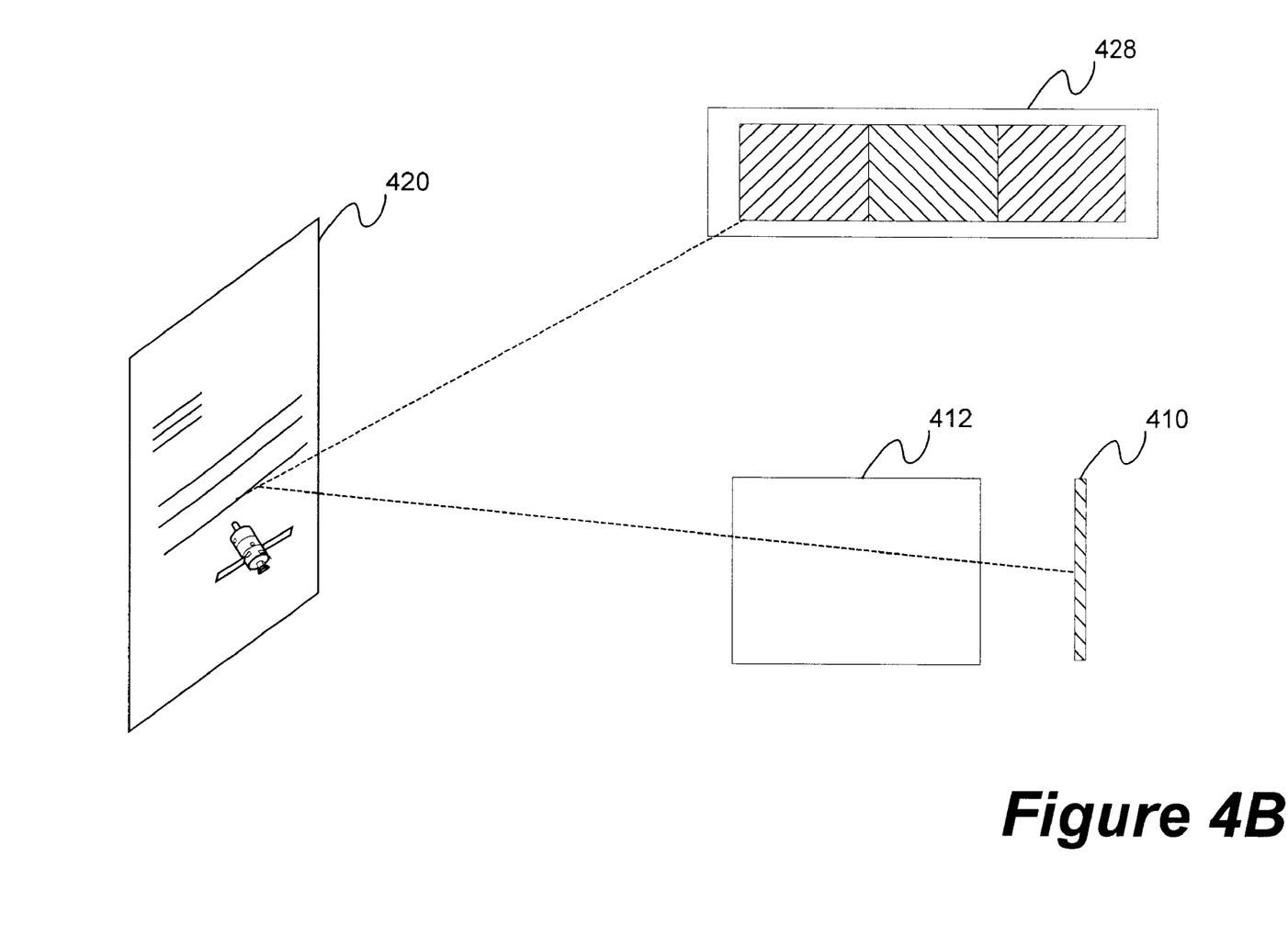
FIGS. 4B and FIG. 4C depict respectively a pictorial view of front illumination and back illumination with respect to an image sensor.
Figure 4C:
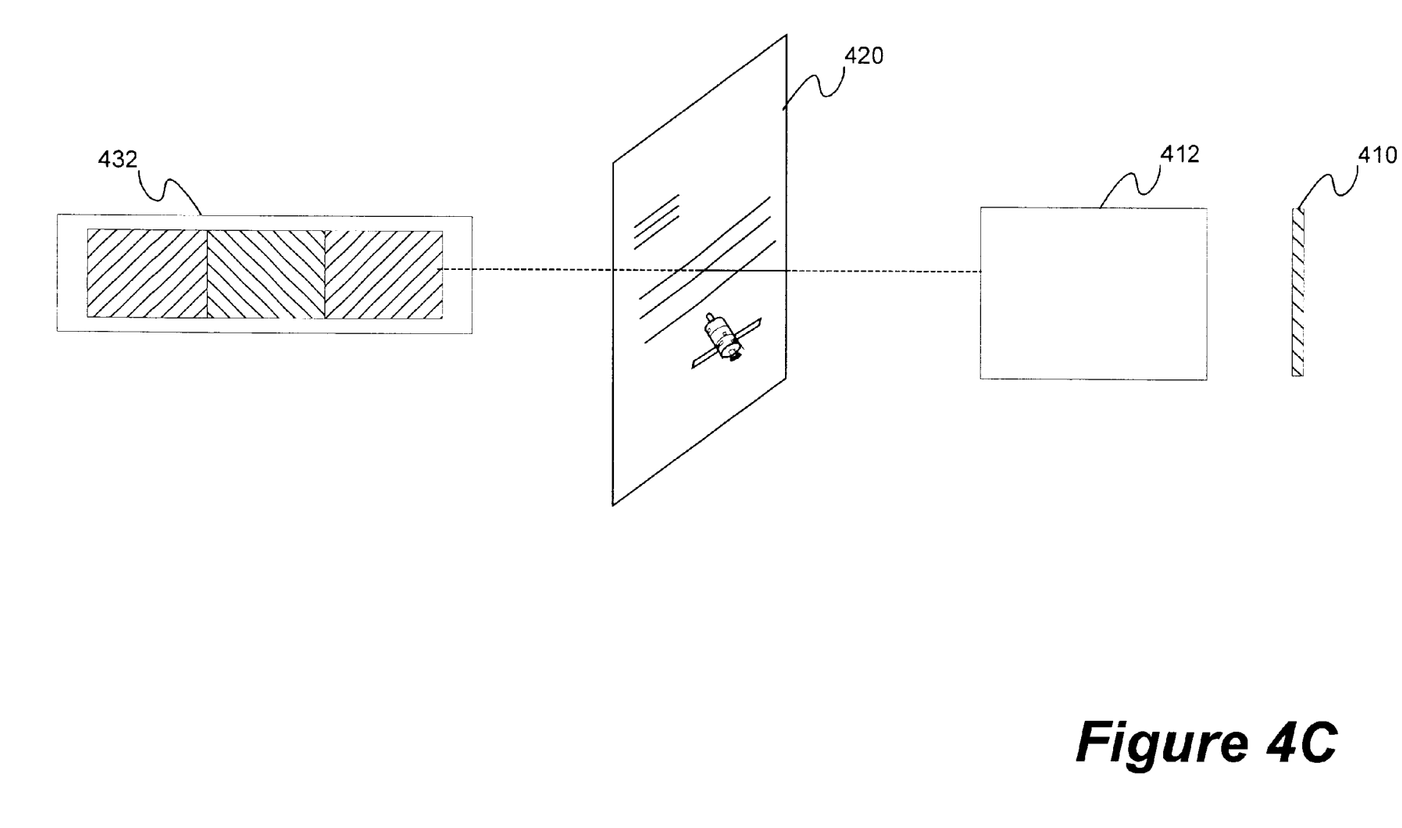

FIGS. 4B and 4C demonstrate respectively the front illumination for an opaque scanning object and the back illumination for a transparent scanning object from the perspective of optics. In FIG. 4B, scanning object 420 is an opaque scanning material, such as a piece of paper, having a front surface facing to image sensor 410. Front illumination source 410 illuminates the front surface of scanning object 420, light reflected from the surface is collected by optical lens 412 and focused upon image sensor 410 so that an image of the surface is obtained. In FIG. 4B, scanning object 420 is a transparent scanning material, such as a piece of film. Back illumination source 432 provides illumination from the back of transparent scanning object 420 such that light transmitted through transparent scanning object 420, namely transmitted light, is collected by optical lens 412 and focused upon image sensor 410 so that an image of the transparent scanning object is obtained.

It should be pointed out that base module 404 is one of the distinctive features of the present invention. With base module 404 mounted to main module 402, mobile scanner 400 is capable of scanning both transparent and opaque scanning document. Typically, a user uses main module 402 for scanning paper-sheet materials in which case illumination source 428 provides front illumination to the materials passing through optical path 426. When the user decides to scan transparent materials, base module 404 can be mounted onto main module 402, in which case illumination source 432 is on to provide back illumination to the transparent materials. Those skilled in the art understand that a switch can be placed on the bottom of main module 402, the switch is so designed that it can be automatically turned on to switch the power supplied to illumination source 428 to illumination source 432 when base module 404 is mounted to main module 402.

Accordingly to another embodiment of the present invention, a light source (emitter) 434 and a photodetector 436 are used to detect if scanning object 420 is opaque or transparent. Preferably, light source 434 and photodetector 436 are aligned so that photodetector 436 is always activated by light source 434. When an opaque sheet is received from receiving opening 422, photodetector 436 becomes inactivated because of the blocked light source 434 by the opaque sheet. A control circuit, not shown in the figure and understood to those skilled in the art, can automatically turn on front illumination source 428. Similarly, when a transparent sheet is inserted into the scanning gap, photodetector 436 remains activated because light source 434 can go through the transparent sheet. Therefore the same control circuit can automatically turn on back illumination source 432.

Figure 4D:
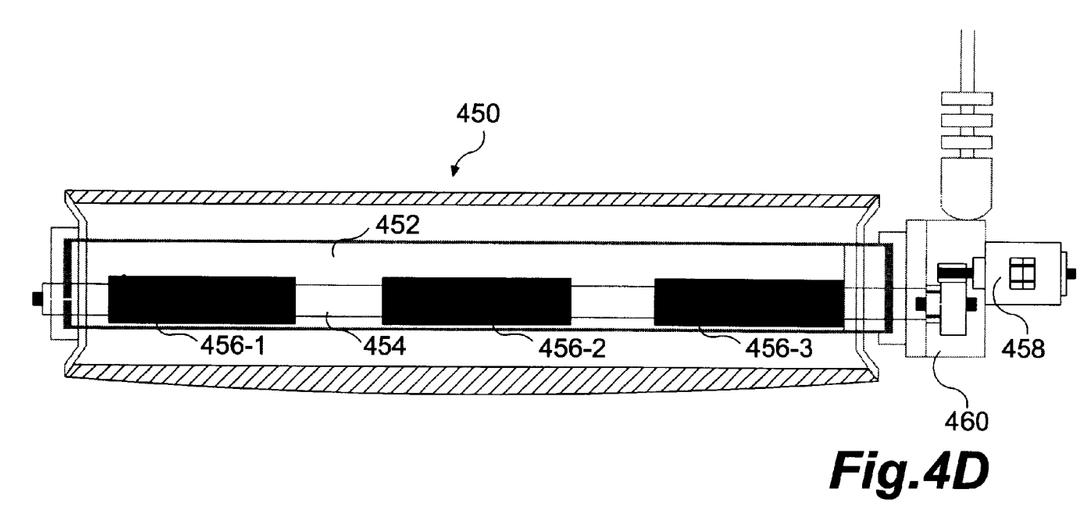
FIGS. 4D to 4F show respectively three different views of the internal structures of a mobile scanner according to one embodiment.
Figure 4E:
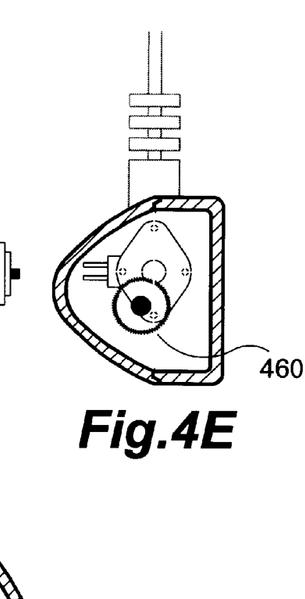
Figure 4F:
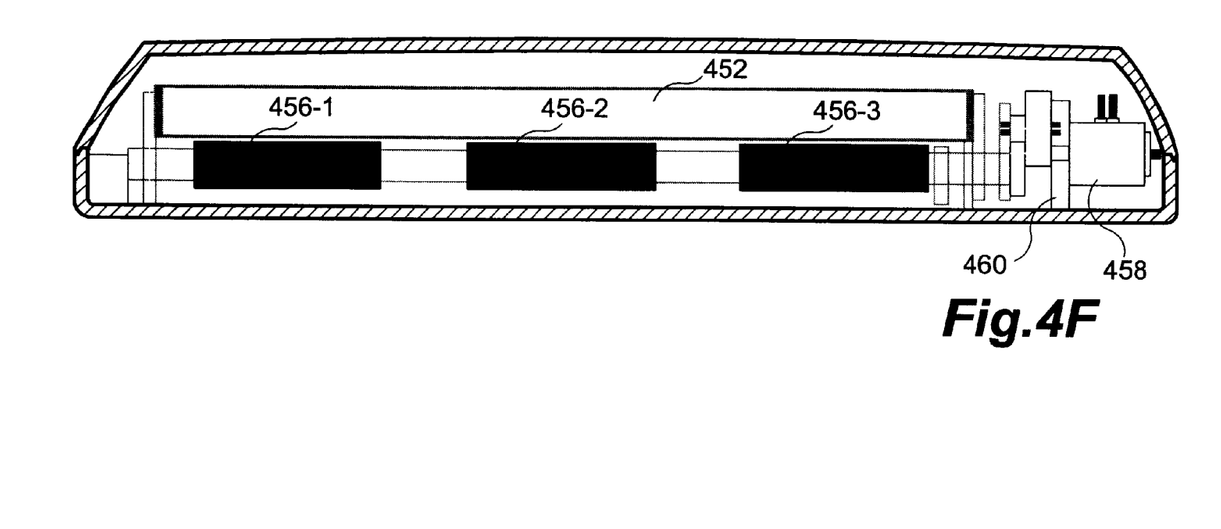

For completeness, FIGS. 4D to 4F illustrate a top view, a side view and a front view of the internal structure of main module 402. Elongated part 452 corresponds to image sensing module 406 of FIG. 4A and includes an image sensor, a (front) illumination source and a rod lens array. Shaft 454 including one or more rubber-surfaced tube 456 is rotated by a motor 458 through a gearbox 460. When a scanning object, not shown, is inserted into the scanner, motor 458 causes shaft 454 to rotate at a speed adjusted by gear box 460 and the scanning object is then carried along by rubber surfaced tube 456 to move against elongated part 452 so that the image sensor therein can image the scanning object completely. It should be pointed out that, fundamentally different from the scanners in the market, there is no microprocessor and other electronic components in main module 402 to control the operation of the image sensor and the illumination source. The overall system performance of the scanner is not fixed rather depending on a host computer with which the scanner is coupled to operate.

Figure 5:
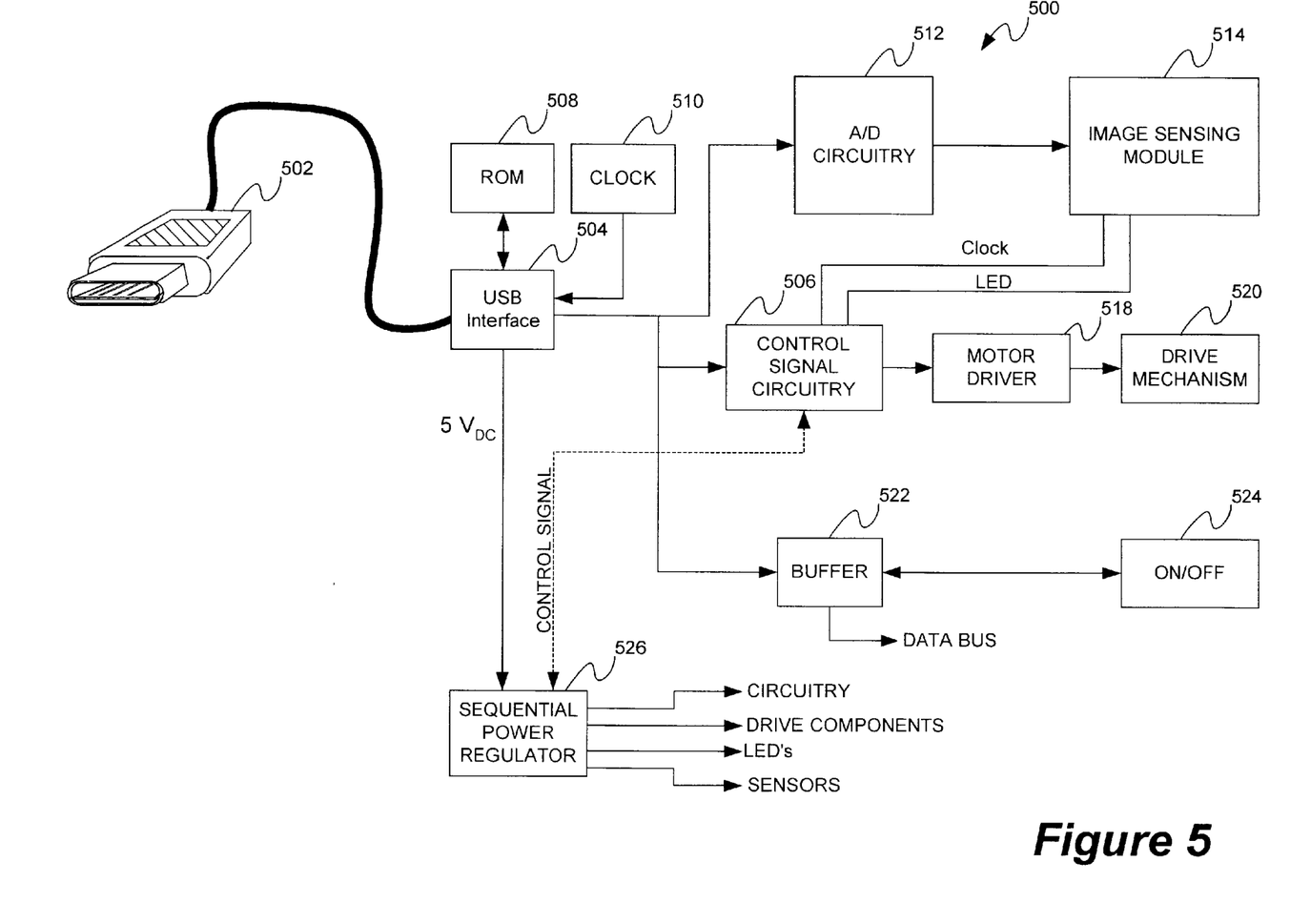
FIG. 5 shows an internal block diagram of an interface engine implemented in a USB connection that may be used in the present invention to couple the scanner to a computing device.

Referring now to FIG. 5, there is shown an internal block diagram of interface engine 500 implemented with universal serial bus connector 502 and universal serial bus interface 504. Universal serial bus connector 504 preferably meets the well-known Universal Serial Bus (USB) standards as defined in the Universal Serial Bus Specification Revision 1.1 which is incorporated by reference. Universal serial bus connector 502 includes differential data input/output (I/O) lines, a ground reference GND, as well as the integral power node all of which are preferably coupled through universal serial bus interface to the device circuits shown.

Read Only Memory (ROM) 508 provides information to the computing device on what functions or procedures universal serial bus interface 504 performs and what system resources (I/O, IRQ, etc) it requires. Clock 506, typically an oscillator circuit, provides a central clocking signal to all the parts so that connected components work in synchronization.

According to one embodiment, image sensing module 514 outputs analog signals generated from the charge signals in the photodetectors of the image sensor when image sensor is impinged with incident light (reflected or transmitted light). The analog signals are received by an analog-to-digital (A/D) converter 512 through an analog signal line and the resultant digitized (digital) signals are uploaded to the computing device via the universal serial bus connection. The illumination source in the image sensing module 514 is controlled and synchronized by control signals from control signals circuitry 506 that operates under system control signals from an associated computer device (i.e., computing device 102 of FIG. 1) via USB interface 504. Typically, the illumination source comprises three primary colored lights, such as red, green and blue. To reproduce a color image, three primary color intensity images must be obtained. In other words, A/D converter 512 receives three analog signals respectively for each of the colored lights and produces respectively three digital signals.

The control signals from control signals circuitry 506 ensures that only one of the three lights is "ON" at one time for a specific period and each of the lights is successively turned on. Similarly, to ensure that drive mechanism 520 to operate in synchronization with image sensing module 514, motor drive 518 receives control signals from control signals circuitry 506. It is understood to those skilled in the art that control signals circuitry 506 is controlled by system control signals generated from the computing device via the universal serial bus connection and comprises many logic circuits so as to generate control signals with different timings. As will be explained below, the system control signals are generated in the computing device that operates an application program, the application program implementing a process that uses the computing device to ultimately controls the operation of the scanner. Upon receiving the system control signals, USB interface 504, which typically an ASIC circuit, produces interface control signals to synchronize all parts in the interface engine. With respect to the interface control signals, control signals circuitry 506 generates a set of scanner control signals.

Each of the scanner control signals is used to synchronize the operation of a particular part. For example, three illumination control signals are generated to control the operation of the illumination source comprising the three colored lights. The timing in the illumination control signals is so designed that only one of the lights is turned on for a specific period at one time and the three lights are successively turned on. Similarly sensor control signals and motor control signals are generated with respect to the illumination control signals so that the image sensing module and the motion mechanism can work harmoniously to produce images of scanning objects. Additionally, sequential power regulator 526 sequentially powers the system components in accordance with instructions received from control signals circuitry 506 to minimize overall power requirements.

Optionally, there is one protection control signal from control signals circuitry 504 to motor driver 518. The protection control signal is used to protect the motor drive mechanism 520. For example, in the middle of scanning a document, in the event of a malfunction, the protection control signal can immediately cause motor drive 518 to stop the operation of the motor in drive mechanism 520.

Figure 6:
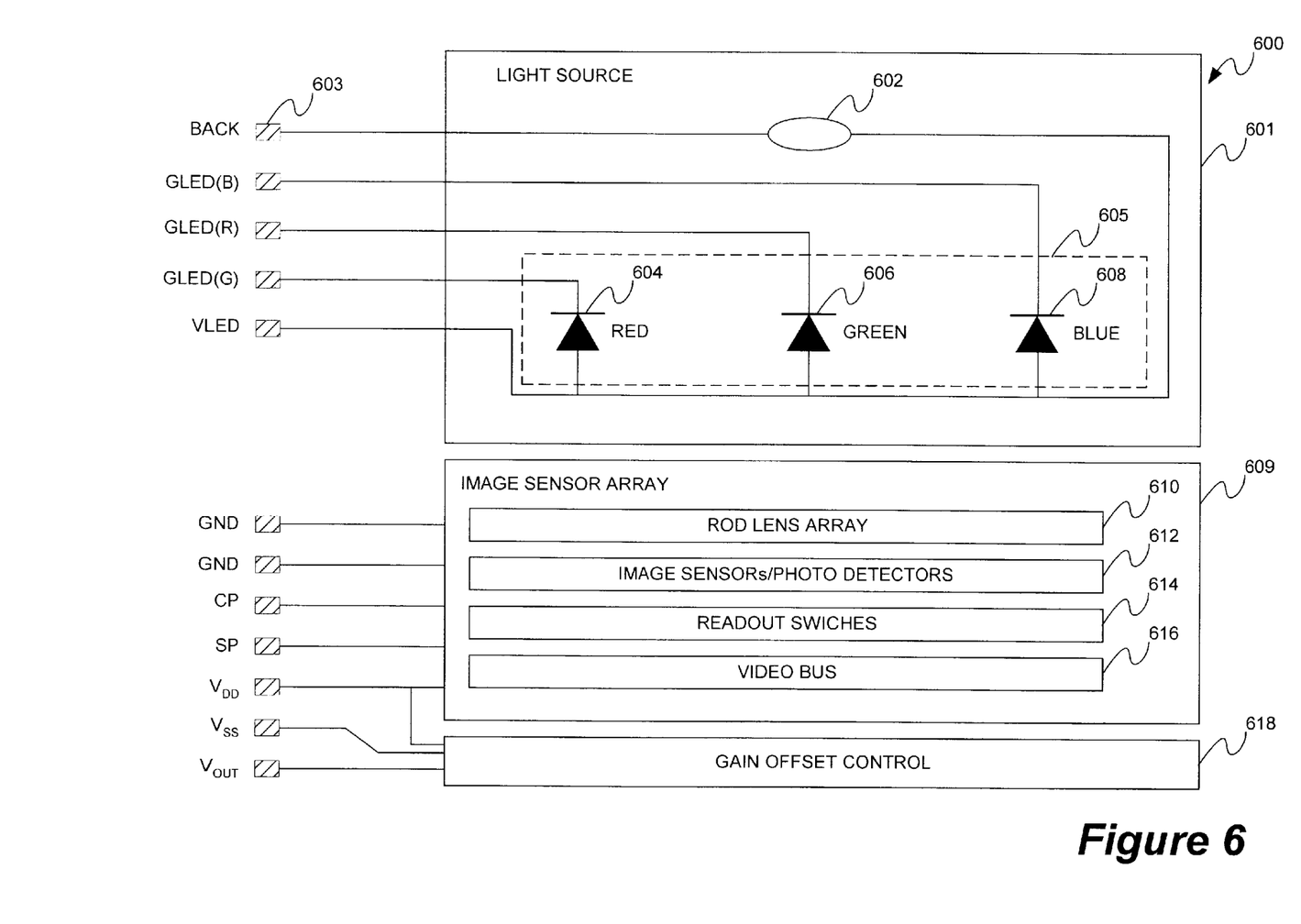
FIG. 6 illustrates an internal functional diagram of an image sensing module in one embodiment of the present invention.

To further understand the principles of the present invention, FIG. 6 shows an internal functional diagram of sensing module 600 according to one embodiment of the present invention. As illustrated, there are two illumination sources, first one 602 is for back illumination and second one 605 is for front illumination. The front illumination source comprises a red LED 604, a green LED 606 and a blue LED 608, each controlled respectively by a control signal, GLED, RLED or BLED at respective connectors.

For simplicity, back illumination source 602 is shown as one light and one connector 603. Those skilled in the art understand that back illumination source 602 may be implemented with a single LED or a fluorescent light controlled by an "ON" signal at connector 603, and alternatively with three colored lights similar to red LED 604, green LED 606 and blue LED 608, in which case connector 603 should be implemented with three separate connectors, and the corresponding control signals may be provided from USB interface 504 of FIG. 5. As described above, either illumination source 602 is turned "ON" for a transparent scanning object or the LEDs are successively turned "ON" for an opaque scanning object.

The rod lens array 610 collects either the reflected light from the opaque scanning object illuminated by one of red LED 604, green LED 606 and blue LED 608 or transmitted light from the transparent scanning object illuminated by back illumination source 602 and focuses the light onto image sensor 612. Image sensor 612 comprises, for example, N photodetectors. Each of the photodetectors collects light cast thereon during each integration process and generates a pixel signal. Upon the completion of the integration process, the pixel signals, each respectively generated by one of the photodetectors, are sequentially readout to the video bus 616 as a scanning signal via readout switch array 614 controlled by control signals from USB interface 504 of FIG. 5. It should be noted that image sensor 612 may be a CMOS type sensor and those skilled in the art will understand that the description works the same for CCD type sensors.

Switch array 614 comprises the same number of the readout switches as the number of the photodetectors in the image array 612. It is understood to those skilled in the art that each of the readout switches may be implemented by a diode that becomes "On" or "passing through" when a proper voltage from USB interface 504 of FIG. 5 is applied across. As shown in the figure, the scanning signal is coupled to a gain & offset control circuit 618. The scanning signal is processed, including amplified and offset, in gain & offset control circuit 618 with respect to a desired adjustment and subsequently output as a signal $V_{out}$ to USB interface 504 of FIG. 5.

Figure 7A:
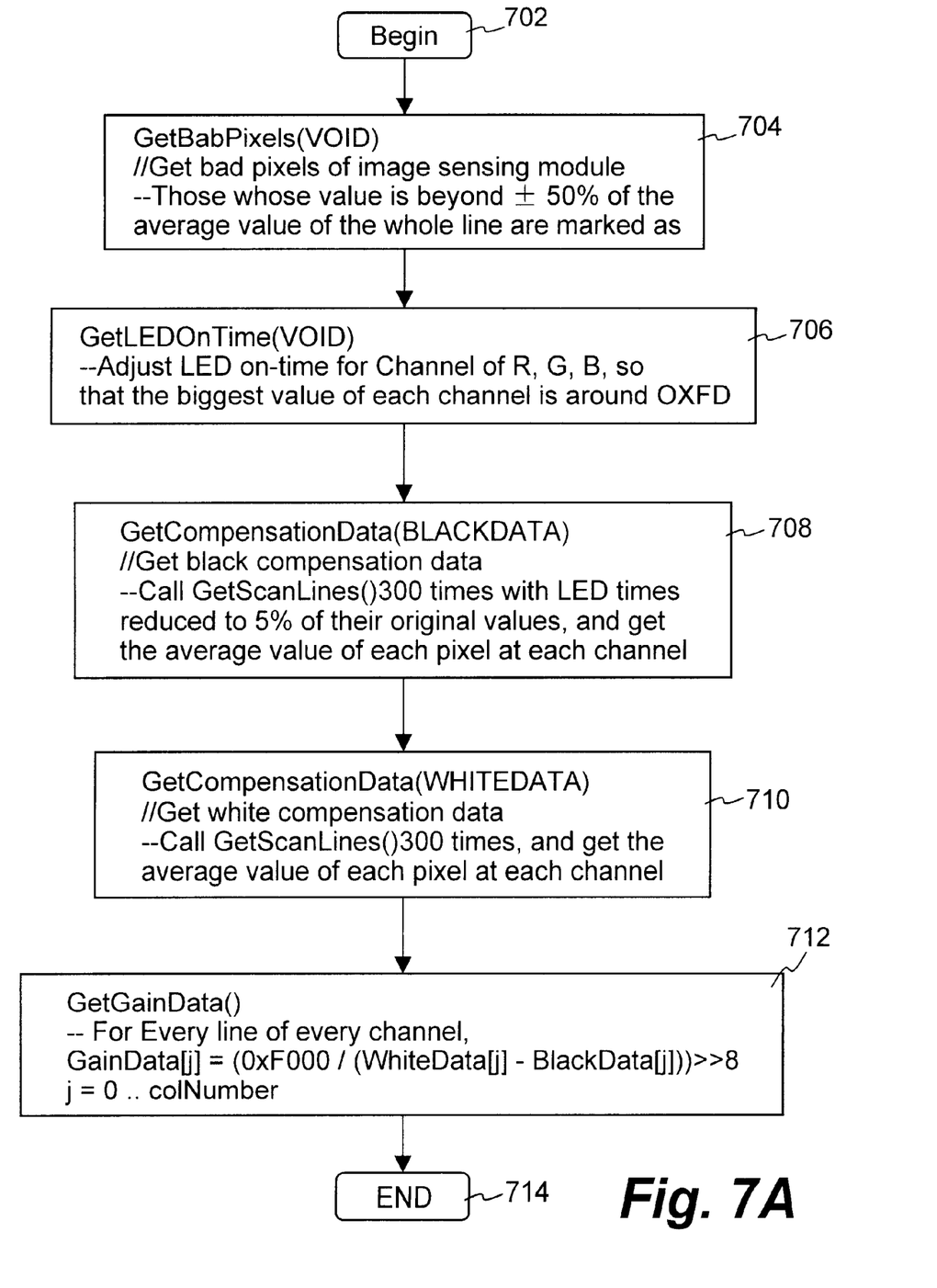
FIGS. 7A to 7C illustrate a flowchart of a process that is executed in a computing device to control the interface engine in FIG. 5.
Figure 7B:
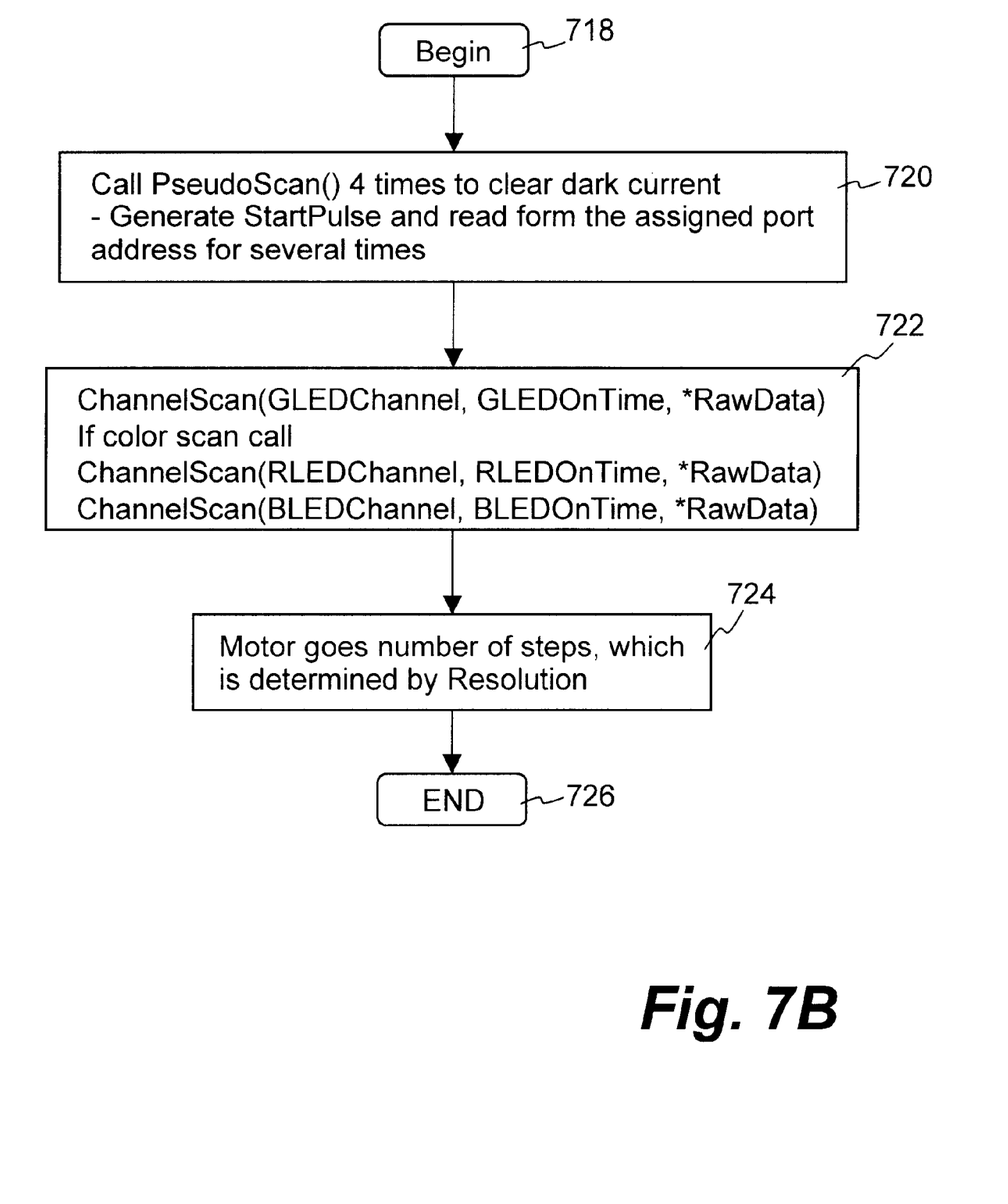
Figure 7C:
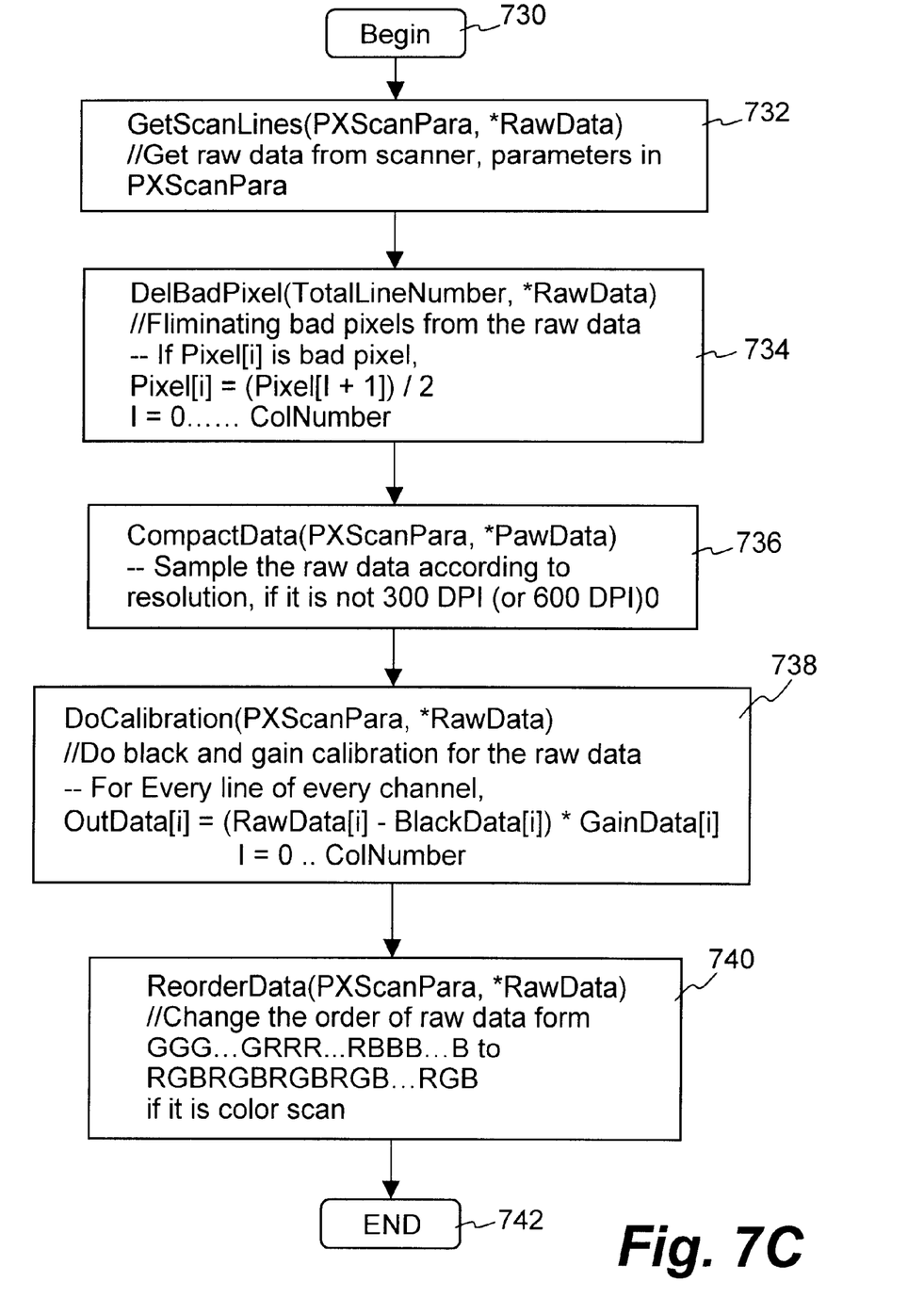

FIGS. 7A to 7C show flowcharts of the process that can be used to control the operation of the interface control card and subsequently of the image sensing module and the motion mechanism and should be understood in conjunction with FIG. 5. According to one embodiment of the present invention, a compiled and linked version of the process is executed in a computing device with which the scanner operates.

In FIG. 7A, the process starts with a calibration procedure to get various calibration data that will be used to refine image raw data during actual image acquisition. Because of various practical reasons, the image sensor in the image sensing module may not produce intensity signals or valid signals from all of the photodetectors. To avoid undesirable (bad) signals, at 704, one or more lines of scanning signals are acquired to detect if there are any bad signals in the acquired scanning signals. As described above, this is done through the interface engine that produces the digital signals of the scanning signals. If there are any digital signals that have values beyond ±50% of the average of the entire line of digital signals, these pixels are marked "bad".

At 706, the process is moved to get correct exposure times for the three respective colored lights. Typically, the three colored lights are red, green and blue light tubes stimulated by respective one or more red, green and blue LEDs. It is known that the sensitivity of the image sensor to the colors and the light intensities from the three colored lights are different. To avoid any biased illumination, a set of calibrated timing parameters must be derived from an actual test. There can be many ways to derive this set of timing parameters. According to one implementation, the set of timing parameters is derived with respect to the maximum values in the three respective lines of signals obtained under independent and respective illumination of the three colored lights.

At 708, the process is moved to obtain the most appropriate gain and offset from the actual signals. Preferably a few hundreds of lines of signals are acquired from the same scanning lines under the same lighting conditions (reduced to 5% of the adjusted full capacity). These signals are then averaged to derive an offset, referred to as BlackData, of each of the three colored lights. At 710, the process is moved to obtain the respective maximum values, referred to as WhiteData, from a few hundreds of lines of signals that are acquired under the same lighting conditions (adjusted full capacity). Hence a set of WhiteData and BlackData is obtained for each colored illumination.

At 712, the process is moved to calculate the gain value, referred to as GainData, with respect to the respective obtained set of WhiteData and BlackData.

FIG. 7B shows the process (image acquisition) with the control of the illumination source and motion mechanism. It should be noted herein that the process does not have to identify which illumination source is in operation. Typically, before the acquisition process starts, a cleanup procedure is executed at 720. The purpose of cleanup procedure is to ensure that no signal residues are in the image sensor. At 722, for every scanning line, the colored lights are respectively and successively turned on for a specific time by the respective exposure timing parameters obtained in the calibration process. To be specific with one implementation, the green light is kept "ON" for a duration of GLEDOntime, the red light is kept "ON" for a duration of RLEDOntime and the blue light is kept "ON" for a duration of BLEDOntime. Under each of the lighting condition, three lines of digital signals are respectively and subsequently obtained before the motion mechanism advances the scanning object for the next scanning at 724.

FIG. 7C shows the process for image acquisition. At 732, lines of image data are captured under the respective exposure timing parameters obtained in the calibration procedure. At 734, those marked "bad" signals are replaced using an average of neighbor signals.

Generally, the scanner is designed to scan at a fixed resolution, for example, 300 dpi or 600 dpi. If a user decides to have an image resolution other than what the scanner can provide, the scanned digital signals are extrapolated or interpolated at 736 to produce the desired resolution. Before the digital signals are finally output, for example, for display, the digital signals are corrected with the gain and offset obtained empirically before. At 740, the corrected digital signals (image pixels) are regrouped to comply with the traditional RGB data format.

The present invention has been described in sufficient detail with a certain degree of particularity. It is understood to those skilled in the art that the present disclosure of embodiments has been made by way of examples only and that numerous changes in the arrangement and combination of parts may be resorted without departing from the spirit and scope of the invention as claimed. Accordingly, the scope of the present invention is defined by the appended claims rather than the forgoing description of embodiments.

We claim:

1. A mobile scanner comprising
   an image sensing module comprising:
   a one-dimensional image sensor array;
   a lens mounted in front of the image sensor array; and
   a first illumination source comprising three colored lights that are turned on independently and successively by an illumination control signal when a scanning document is opaque;
   a second illumination source comprising a colored light that is turned on by the illumination control signal when the scanning document is transparent;
   a motion mechanism working in synchronization with the image sensing module, the motion mechanism causing the scanning document illuminated by one of the first and the second illumination sources to pass through the lens so that the scanning document is imaged by the image sensor array; and
   a universal serial bus interface module coupling the image sensing module and the motion mechanism to a computing device and receiving power and system control signals therefrom.

2. The mobile scanner as recited in claim 1, wherein the sensor array, the first illumination source, the second illumination source and the motion mechanism receive power through a sequential power regulator.

3. The mobile scanner as recited in claim 2, wherein the sequential power regulator receives control signals from a universal serial port connection with the computing device.

4. The mobile scanner as recited in claim 3, wherein the sequential power regulator is responsive to the power status of the computing device.

5. The mobile scanner as recited in claim 2, wherein the image sensor array produces respectively three intensity signals when the three colored lights of the first illumination source are turned on independently and successively by the illumination control signal.

6. The mobile scanner as recited in claim 5, wherein the three intensity signals are used to derive three respective digital signals.

7. The mobile scanner as recited in claim 6, wherein the three respective digital signals are uploaded to the computing device for further processing.

8. The mobile scanner as recited in claim 2, wherein the image sensor array produces respectively three intensity signals when the three colored lights of the second illumination source are turned on independently and successively by the illumination control signal.

9. The mobile scanner as recited in claim 8, wherein the three intensity signals are used to derive three respective digital signals.

10. The mobile scanner as recited in claim 9, wherein the three respective digital signals are uploaded to the computing device for further processing.

11. The mobile scanner as recited in claim 1, wherein the universal serial port interface module comprises:
- a control circuit receiving system control signals from the computing device and generating:
    - the illumination control signal to control operations of the first and the second illumination source;
    - sensor control signals to control operations of the image sensor array;
    - motor control signals to control operations of the motion mechanism in synchronous with the operations of the first and second illumination sources and the image sensor array; and
    - a control signal for the sequential power regulator such that power delivery to the first illumination source, the second illumination source, the sensor array and the motion mechanism are respectfully coordinated.

12. The mobile scanner as recited in claim 1, wherein the control process is executed by a processor in the computing device and is caused to:
- perform calibration procedures of the image sensing module via the universal serial bus interface;
- provide exposure timing parameters for an illumination source in the color image sensing module providing controlled illumination to the scanning document; and
- synchronize the motions of the motion mechanism.

13. A mobile scanner comprising:
- a main case including an image sensing module and a motion mechanism, wherein the image sensing module includes a one-dimensional image sensor array, a lens mounted in front of the image sensor array; and an illumination source comprising at least two colored lights that are turned on independently and successively by an illumination control signal when a scanning document is opaque, and wherein the scanning document is moved across the image sensing module by the motion mechanism;
- an interface engine coupled to the image sensing module and the motion mechanism, the interface engine including electronic parts supporting operations of the image sensing module and the motion mechanism;
- a universal serial bus coupled the interface engine to a computing device so that the interface engine draws voltage therefrom to energize the electronic parts therein and support the image sensing module and the motion mechanism to operate synchronously, and
- wherein a calibration procedure for the image sensing module is carried out in the computing device that causes the mobile scanner to scan a test sheet to produce test signals for the computing device to determine various parameters for correcting actual scanning signals.

14. The mobile scanner of claim 13, wherein the interface engine is enclosed in the main case and communicate with the computing device through the universal serial bus.

15. The mobile scanner of claim 13, wherein the interface engine is housed in a separate case integrated with the universal serial bus.

16. The mobile scanner of claim 13, wherein the interface engine includes an A/D converter that receives analog signals from the image sensing module and converts the analog signals to digital signals, the digital signals being transported to the computing device through the universal serial bus.

17. The mobile scanner of claim 13 further comprising:
- a base case that can be removably mounted to the main case; and
- wherein the main case includes a first illumination source, and the base case includes a second illumination source; the first illumination source is turned on when a scanning object is opaque and the second illumination source is turned on when the scanning object is transparent.

18. The mobile scanner of claim 17, wherein the mobile scanner can scan an opaque document without the base case being mounted and wherein the mobile scanner can scan a transparent document with the base case being mounted.

19. The mobile scanner as recited in claim 13, wherein the calibration procedure is included in an executable computer program running in the computing device.

20. The mobile scanner as recited in claim 13, wherein the scanning signals are extrapolated or interpolated depending on a desired resolution.

* * * * *